United States Patent [19]

Taira et al.

[11] Patent Number: 4,500,575

[45] Date of Patent: Feb. 19, 1985

[54] HOT-MELT ADHESIVE OF A COPOLYESTER OF A DIBASIC ACID WITH A POLYHYDRIC ALCOHOL

[75] Inventors: Kazuo Taira, Tokyo; Akihiko Morofuji, Yokohama; Hiroshi Ueno, Yokosuka; Seishichi Kobayashi, Yokohama, all of Japan

[73] Assignee: Toyo Seikan Kaisha, Ltd., Tokyo, Japan

[21] Appl. No.: 543,148

[22] Filed: Oct. 18, 1983

[30] Foreign Application Priority Data

Oct. 28, 1982 [JP] Japan ................... 57-188141

[51] Int. Cl.³ .................. B65D 0/00; C08G 63/02
[52] U.S. Cl. ..................... 428/35; 528/272; 528/302; 528/305; 528/308.6; 528/308.7
[58] Field of Search ............ 528/272, 302, 305, 308.6, 528/308.7; 428/35

[56] References Cited

U.S. PATENT DOCUMENTS

| | | | |
|---|---|---|---|
| 4,156,774 | 5/1979 | Buxbaum et al. | 528/302 X |
| 4,363,853 | 12/1982 | Imamura et al. | 528/302 X |
| 4,395,538 | 7/1983 | Taira et al. | 528/272 |
| 4,419,507 | 12/1983 | Sublett | 528/302 |

*Primary Examiner*—Lucille M. Phynes

*Attorney, Agent, or Firm*—Sherman & Shalloway

[57] ABSTRACT

Disclosed is a hot-melt adhesive which comprises a copolyester of a dibasic acid component comprising 70 to 97 mole % of terephthalic acid and other dibasic acid with a polyhydric alcohol component comprising 70 to 97 mole % of 1,4-butane-diol, 3 to 30 mole % of diethylene glycol and up to 20 mole % of other polyhydric alcohol having 2 to 5 carbon atoms, said copolyester having a reduced viscosity of at least 0.6 dl/g as measured at a temperature of 30° C. in a phenol/tetrachloroethane mixed solvent having a phenol/tetrachloroethane weight ratio of 60/40 at a polymer concentration of 0.25 g/100 ml, a glass transition temperature of at least 31° C. and a crystallinity of 15 to 40 %.

This hot-melt adhesive is excellent in the operation adaptability, and in the form of a film, the adhesive has an appropriate rigidity and a good dimension stability. Furthermore, when this hot-melt adhesive is formed into an adhesive layer between seams by hot bonding, the adhesive layer provides a high creep resistance and a good dimension stability. This hot-melt adhesive is valuably used for producing a metal vessel having a circumferential side seam by bonding cup-shaped lower and upper members along circumferential open ends of the two members.

7 Claims, 8 Drawing Figures

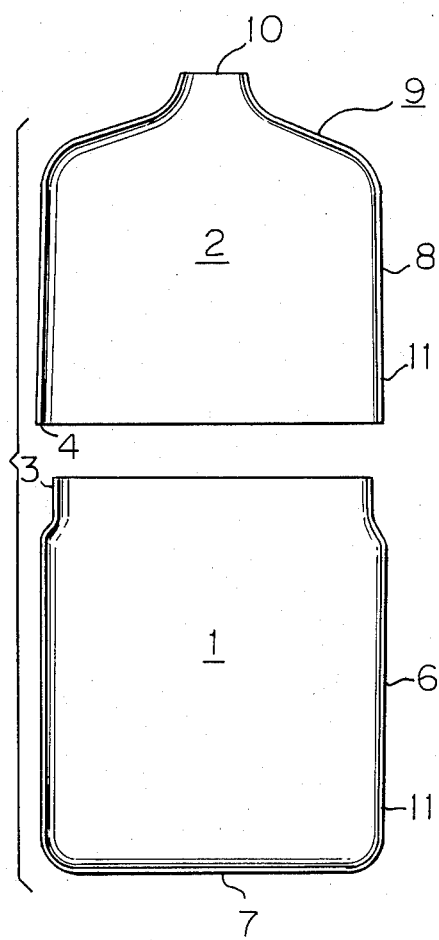
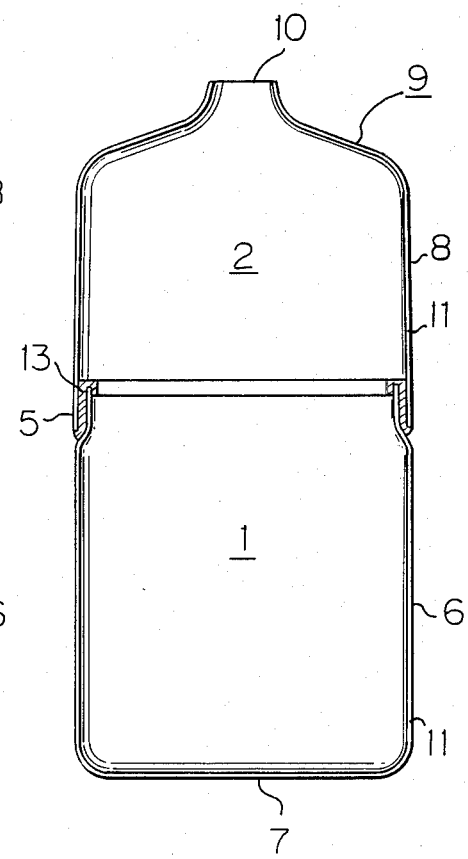

HOT-MELT ADHESIVE OF A COPOLYESTER OF A DIBASIC ACID WITH A POLYHYDRIC ALCOHOL

BACKGROUND OF THE INVENTION (1) Field of the Invention

The present invention relates to a copolyester type hot-melt adhesive. More particularly, the present invention relates to a copolyester type hot-melt adhesive suitable for manufacturing metal vessels having a circumferential side seam by bonding circumferential open ends of cup-shaped lower and upper members to each other.

(2) Description of the Prior Art

A bottle-shaped metal vessel having a circumferential side seam formed by lap-bonding circumferential open ends of cup-shaped upper and lower members obtained by draw forming or draw-ironing forming of a metal blank is advantageous in various points over a so-called can-shaped metal vessel.

As conventional packing metal vessels, there can be mentioned so-called three-piece cans in which can lids are double-seamed to the top and bottom of a can body having a side seam to form sealed portions, and so-called two-piece cans in which a can lid is double-seamed to an open end of a cup-shaped can body formed by drawing or draw-ironing of a metal blank.

However, these metal vessels having a double-seamed structure are insufficient in the pressure resistance of the sealed portion. Furthermore, these metal vessels involve a problem in connection with the saving of the material of the metal blank. More specifically, in the same formed by double seaming, the material constituting the seam is first deformed by the load imposed on the seam, and leakage on the seam or fracture of the seam is caused under a relatively small load by this deformation. In order to prevent this disadvantage, it is necessary that the thickness of the metal blank should considerably be increased. In the field of packing vessels, from the economical viewpoint and in order to reduce the weight of the vessel, it always is required to reduce the thickness of the metal blank. In the case where the thickness of the wall of the vessel barrel is reduced, buckling is readily caused by a load applied in the axial direction of the vessel at the double seaming step or the flanging or other preparing step.

In case of a bottle-shaped metal vessel formed by lap-bonding open ends of cup-shaped upper and lower members, even if the thickness of the metal blank is extremely small, no deformation of the material constituting the seam is caused and the seam can resist up to a load corresponding to the shear strength of the seam irrespectively of the thickness of the metal blank. Furthermore, since the double seaming step is unnecessary, this metal vessel is advantageous in that the thickness of the side wall of the vessel can be reduced without the risk of buckling.

However, when a circumferential side seam is formed by lap-bonding open ends of cup-shaped lower and upper members, various limitations are imposed on adhesives used for lap bonding.

More specifically, although both the ends of a straight seam of a straight can body formed by lap bonding are mechanically secured by seaming with can lids, the above-mentioned circumferential side seam is not mechanically secured along the entire circumference at all, and the dimensional deformation of the seam per se is readily caused. Furthermore, since the diameter of the open end portion is going to change when the temperature changes, a stress is readily generated in the adhesive layer. Moreover, since the thickness of the open end portion constituting the seam is reduced in many cases, the seam easily undergoes deformation when an external force is applied. Therefore, it is required that the adhesive used should have a strong bonding force to the coating on the surface of the metal blank and that the adhesive layer should have high mechanical strength and dimension stability and the physical properties of the adhesive layer should be thermally stable and not be changed with the lapse of time.

In this metal vessel having a circumferential side seam, the load applied to the vessel at the heat sterilization or during the storage or transportation substantially acts as the shearing force on the adhesive. Moreover, the adhesive layer present in the seam is inevitably influenced by the content in the vessel since the adhesive layer is perpetually contacted with the content.

From the viewpoint of the adaptability to the bonding operation or the adhesion strength, a hot-melt adhesive has been widely used as an adhesive for the manufacture of metal vessels. Hot-melt adhesives for providing a high bonding strength are roughly divided into a polyamide type adhesive and a copolyester type adhesive. The former polyamide type adhesive is defective in that water is absorbed in the adhesive layer which is contacted with a liquid content and mechanical properties such as the creep resistance are degraded by this water absorption. As disclosed in U.S. Pat. No. 3,515,628 and Japanese Patent Application Laid-Open Specification No 88939/79, various copolyester type adhesives differing in the composition are known as the latter copolyester type adhesive. However, these copolyester type adhesives are defective in one or more of the following points:

(a) Since the heat of fusion is large at the bonding step or the temperature dependence of the viscosity is not sharp, the adaptability to the bonding operation is poor.

(b) The elongation of the adhesive in the form of a film is excessively large and the dimension stability is poor, and it is difficult to apply the adhesive to a portion to be bonded with a precise dimension without distortion.

(c) The adhesive is poor in the creep resistance, especially at a high temperature or when a content having a perpetual inner pressure, such as beer or carbonated drink, is stored for a long time, and therefore, the dimension of the seam is readily changed, resulting in reduction of the inner pressure and fracture of the seal.

(d) Contraction is readily caused by crystallization after the heat bonding, whereby the dimension of the seam is readily changed or voids or cracks are readily formed in the seam.

SUMMARY OF THE INVENTION

It is a primary object of the present invention to provide a polyester type hot-melt adhesive in which the above defects are effectively eliminated.

Another object of the present invention is to provide a polyester type hot-melt adhesive which is excellent in the adaptability to the bonding operation, has appropriate rigidity and dimension stability in the form of a film and shows good creep resistance and dimension stability when it is formed into an adhesive layer between seams by heat bonding.

Still another object of the present invention is to provide a copolyester type adhesive suitable for the manufacture of a metal vessel having a circumferential side seam formed by bonding open ends of cup-shaped lower and upper metal members.

In accordance with the present invention, there is provided a hot-melt adhesive comprising a copolyester of a dibasic acid component comprising 70 to 97 mole % of terephthalic acid and other dibasic acid with a polyhydric alcohol component comprising 70 to 97 mole % of 1,4-butane-diol, 3 to 30 mole % of diethylene glycol and up to 20 mole % of other polyhydric alcohol having 2 to 5 carbon atoms, said copolyester having a reduced viscosity of at least 0.6 dl/g as measured at a temperature of 30° C. in a phenol/tetrachloroethane mixed solvent having a phenol/tetrachloroethane weight ratio of 60/40 at a polymer concentration of 0.25 g/100 ml, a glass transition temperature of at least 31° C. and a crystallinity of 15 to 40%.

BRIEF DESCRIPTION OF THE DRAWINGS

FIG. 1 is a sectional view illustrating independently upper and lower members of a metal vessel according to the present invention.

FIG. 2 is a sectional view illustrating a metal vessel formed by lap-bonding upper and lower members according to the present invention.

DETAILED DESCRIPTION OF THE INVENTION

Figure 3:
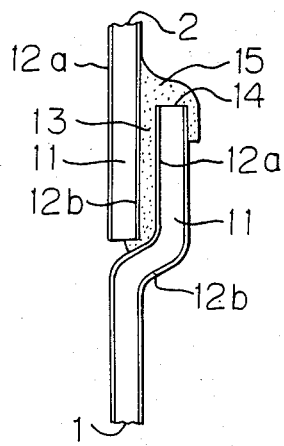
FIG. 3 is an enlarged view showing the section of the bonded portion in the metal vessel shown in FIG. 2.

Referring to FIGS. 1 through 3 illustrating an example of a metal vessel having a circumferential side seam, this bottle-shaped metal vessel comprises a lower member 1 consisting of a seamless cup-shaped molded body composed of, for example, a coated metal and an upper member 2 consisting of a seamless cup-shaped molded body composed of a coated metal. Open ends 3 and 4 of these cup-shaped bodies are lap-bonded to form a circumferential side seam 5, whereby both the upper and lower members are integrated in the form of a vessel.

In this embodiment, the lower member 1 is a cup formed by drawing of a coated metal blank and comprising a side wall 6 and a bottom 7, and the upper member 2 is a cup formed of drawing of a coated metal blank and comprising a side wall 8 and a top wall 9. The diameter of the side wall of the lower member 1 is substantially the same as that of the side wall 8 of the upper member 2, and in this embodiment, both the side walls are substantially equal in height and the seam 5 is located at a height substantially near the middle height of the vessel. The top wall 9 of the upper member 2 has a convex taper surface and an opening 10 for filling or discharging a content is formed at the center thereof. It is seen that the upper member 2 is bonded onto the lower member 1 so that the upper member 2 forms a so-called shoulder and neck of the bottle and an upper half of the barrel of the bottle.

In the embodiment illustrated in FIG. 1, the open end portion 3 of the lower member 1 is drawn by the necking processing conducted in the vicinity thereof so that the diameter of the open end portion 3 is smaller than that of the other barrel wall portion, and the open end portion 3 is inserted into the open end portion 4 of the upper member 2 having a larger diameter. As is apparent from the enlarged view of FIG. 3, the coated metal blank constituting the upper and lower members comprises a metal substrate 11 such as surface-treated aluminum and coatings 12a and 12b acting as the primer and protecting layer. An adhesive layer 13 is formed between the outer surface of the open end portion 3 of the lower member and the inner surface of the open end portion 4 of the upper member to effect bonding and fixation of the lower and upper members. A part of the adhesive 13 protrudes from the seam 5 to form a covering layer 15 for a cut edge 14 of the metal blank located on the inner side of the seam.

The hot-melt adhesive of the present invention is especially valuable as the adhesive 13 for forming the circumferential side seam in a metal vessel as mentioned above. This hot-melt adhesive is characterized in that the hot-melt adhesive is composed of a copolyester of a dibasic acid component comprising 70 to 97 mole %, especially 80 to 95 mole %, of terephthalic acid and other dibasic acid with a polyhydric alcohol component comprising 70 to 97 mole %, especially 80 to 95 mole %, of 1,4-butane-diol, 3 to 30 mole %, especially 5 to 20 mole %, of diethylene glycol and up to 20 mole % of other polyhydric alcohol having 2 to 5 carbon atoms.

It is known that among various polyesters, polybutylene terephthalate is especially excellent in the bondability and adhesion to a metal substrate or an adhesive primer coating formed thereon. However, since polybutylene terephthalate has a considerably high crystallinity, the melting point is high and the quantity of heat for melting the crystal is large. Accordingly, an assembly to be bonded should be heated at a high temperature for a long time and the adaptability to the bonding operation is inferior. In order to reduce the melting point of polybutylene terepthalate and decrease the quantity of heat for fusion of the crystal, other dibasic acid component and/or polyhydric alcohol component is included in polybutylene terephthalate to form a copolyester. In this case, there is encountered a problem in which the temperature dependency of the melt viscosity is much smaller than that of polybutylene terephthalate and the interface to be bonded is sufficiently wetted with the copolyester, and therefore, heating at a high temperature is necessary. Accordingly, it is very difficult to simultaneously satisfy the requirement for decreasing the quantity of heat for fusion of the crystal and the requirement for sharpening the temperature dependency of the melt viscosity to improve the wetting state of the interface to be bonded.

For example, the specification of U.S. Pat. No. 3,515,628 teaches that a copolyester of a dibasic acid component comprising terephthalic acid and adipic acid, sebacic acid, 1,4-cyclohexane-dicarboxylic acid or azelaic acid with a glycol component comprising 1,4-butane-diol alone or in combination with ethylene glycol or neopentyl glycol, which has a glass transition temperature lower than 30° C. and a crystallinity lower than 25%, is used for bonding metals through an epoxy primer. In this copolyester, the melting point is lowered and the quantity of heat for fusion of the crystal is reduced, but the temperature dependency of the melt viscosity is small and the adaptability to the hot bonding operation is not substantially improved. Moreover, since the glass transition temperature is low, when this copolyester is used for formation of a circumferential side seam of the above-mentioned type, deformation of the seam or fracture of the seal on the seam is readily caused by the creep.

Japanese Patent Application Laid-Open Specification No. 88939/79 discloses a hot-melt adhesive comprising as a main ingredient a polyester comprising 1 mole of a dibasic acid component composed of at least 85 mole % of terephthalic acid, 0.65 to 0.97 mole of 1,4-butane-diol alone or in combination with up to 20 mole % of 1,6-hexane-diol and 0.03 to 0.35 mole of polyethylene glycol having a molecular weight of 150 to 550. Since this copolyester contains the polyethylene glycol component having a relatively high molecular weight in the main chain, when this copolyester is applied to the manufacture of a metal vessel having a circumferential side seam of the above-mentioned type, the mechanical strength, especially the creep resistance, of the adhesive layer is reduced and the dimension stability and sealing property of the vessel are insufficient. Furthermore, when this copolyester is formed into a thin film, the elongation is too high and the dimension stability is poor, and the adaptability to the operation of applying the film to a portion to be formed into a seam is very bad. Moreover, since the ether group concentration in the polymer chain is high, the copolyester is relatively susceptible to water and the adhesive layer becomes sensitive to water.

In the copolyester used in the present invention, terephthalic acid of the dibasic acid component has relations to the mechanical strength, rigidity, dimension stability, creep resistance and heat resistance of the copolyester, and the other dibasic acid is important for controlling the crystallinity of the copolyester within the above-mentioned range. When the content of terephthalic acid in the dibasic acid is lower than 70 mole %, the strength, creep resistance and heat resistance of the adhesive layer and the rigidity and dimension stability of the film are inferior to those of the copolyester of the present invention. If the proportion of terephthalic acid exceeds 97 mole %, it is difficult to control the crystallinity of the adhesive layer within the range specified in the present invention, and the heat bondability (bonding strength) to a metal blank, especially a coated metal blank, is reduced.

The alcohol component of the copolyester used in the present invention comprises 70 to 97 mole % of 1,4-butane-diol and 3 to 30 mole % of diethylene glycol. These alcohols have effects of increasing the crystallizing rate of the hot-melt adhesive at the melting-cooling cycle and preventing the post crystallization, that is, the contraction, of the adhesive in the seam. In a copolyester containing ethylene glycol in a large quantity, ester units are brought too close to one another in the polymer chain, prompt transition of the arrangement of molecules to crystals, that is, prompt crystallization, is difficult at the melting-cooling cycle, and the post crystallization is caused with the lapse of time, resulting in reduction of the bonding force due to the contraction, change of the dimension of the seam and leakage. It is construed that if the alcohol component comprises 1,4-butane-diol and diethylene glycol, the distance between the ester units in the polymer chain is considerably prolonged and crystallization is promptly accomplished. A copolyester composed mainly of 1,4-butane-diol is characterized by a high crystallizing rate, and if this is combined with diethylene glycol, the crystallizing rate is further increased. Furthermore, 1,4-butane-diol increases the flexibility of the copolyester and reduces the bonding temperature, and 1,4-butane-diol is an alcohol component preferred for increasing the dimension stability of a film of the copolyester. Diethylene glycol is an alcohol component preferred for adjusting the crystallinity of the copolyester within the range specified in the present invention and relatively sharpening the temperature dependency of the melt viscosity.

In the present invention, it is important that among various ether polyols, diethylene glycol should be selected and used. When triethylene glycol or polyethylene glycol having a higher molecular weight is used, the copolyester becomes excessively soft, the dimension stability of the film is degraded, and the heat resistance, creep resistance and mechanical properties of the adhesive are inferior to those of the adhesive of the present invention. Furthermore, the crystallinity of the copolyester is reduced and the temperature dependency of the melt viscosity becomes small. Moreover, the hot water resistance is reduced by increase of the ether concentration.

If the 1,4-butane-diol content in the copolyester is too low and below the range specified in the present invention and the diethylene glycol content is too high and exceeds the range specified in the present invention, the copolyester is likely to become too soft and the dimension stability of the film is readily degraded.

The alcohol component of the copolyester may be composed solely of 1,4-butane-diol and diethylene glycol or may further contain other polyhydric alcohol having 2 to 5 carbon atoms in an amount of up to 20 mole %. As this polyhydric alcohol, there can be mentioned ethylene glycol, propylene glycol, neopentyl glycol and glycerol. These polyhydric alcohols may be used singly or in the form of a mixture of two or more of them.

As the dibasic acid other than terephthalic acid, there can be mentioned isophthalic acid, cyclohexanedicarboxylic acid, adipic acid, sebacic acid, succinic acid and dodecane-dicarboxylic acid. These dibasic acids may be used singly or in the form of a mixture of two or more of them.

The copolyester used in the present invention is prepared by polycondensing the above-mentioned dibasic acid and alcohol components under known conditions.

In view of the mechanical properties, it is indispensable that the copolyester should have a reduced viscosity (inherent viscosity) of at least 0.6 dl/g as measured at a temperature of 30° C. in a phenol/tetrachloroethane mixed solvent having a phenol/tetrachloroethane weight ratio of 60/40 at a polymer concentration of 0.25 g/100 ml. From the viewpoint of the creep resistance, it is indispensable that the glass transition temperature (Tg) of the copolyester should be at least 31° C. Furthermore, in view of the mechanical properties and the adaptability to the heat bonding operation, it is indispensable that the copolyester should have a crystallinity of 15 to 40%.

The copolyester may be used singly or a blend of two or more copolyesters included within the scope of the present invention may be used. Furthermore, the copolyester of the present invention may be used in the form of a blend with other thermoplastic resin, for example, an olefin resin such as polyethylene, polypropylene, an ethylene-propylene copolymer, an ethylenebutene-1 copolymer, an ion-crosslinked olefin copolymer (ionomer), an ethylene-vinyl acetate copolymer, an ethylene-acrylic acid copolymer, acid-modified polyethylene or acid-modified polypropylene. Of course, the olefin resin is used in an amount of up to 50% by weight, especially up to 30% by weight, based on the total amount of the adhesive.

The copolyester type hot-melt adhesive of the present invention is advantageously used as an adhesive for bonding circumferential open ends of cup-shaped upper and lower members as shown in the drawings.

In this case, as the metal blank to be formed into the seamless cup, there can be used an untreated steel plate (black plate), various surface-treated steel plates, for example, deposited steel plates such as tin-deposited steel plates (tin-plates), zinc-deposited steel plates, aluminum-deposited steel plates, nickel-deposited steel plates and chromium-deposited steel plates, electrolytically treated steel plates such as electrolytically chromate-treated steel plates, chemically treated steel plates such as steel plates treated with phosphate and/or chromate, plates of light metals such as aluminum, and composites thereof.

The hot-melt adhesive of the present invention may be used for bonding an uncoated metal blank. However, it is preferred that the hot-melt adhesive of the present invention be applied to a metal blank having an adhesive primer coating formed thereon. An optional adhesive lacquer composed of a thermosetting or thermoplastic resin may be used as the adhesive primer. For example, there may be used modified epoxy lacquers such as a phenol-epoxy lacquer and an amino-epoxy lacquer, vinyl or modified vinyl lacquers such as a vinyl chloride-vinyl acetate copolymer, a partially saponified vinyl chloride-vinyl acetate copolymer, a vinyl chloride-vinyl acetate-maleic anhydride copolymer and an epoxy-modified, epoxyamino-modified or epoxyphenol-modified vinyl resin, and a styrene-butadiene copolymer lacquer. The adhesive of the present invention has an especially high bondability to a coating of a vinyl chloride resin having a vinyl chloride unit content of 30 to 97% by weight and containing carboxyl groups and/or hydroxyl groups at a concentration of 10 to 500 millimoles per 100 g of the resin.

This lacquer contains vinyl chloride units in an amount of 30 to 97% by weight. The vinyl chloride units are present in the form of a copolymer with other monomer, or parts of the vinyl chloride units are present in the form of a copolymer as mentioned above and the remaining vinyl chloride units are present in the form of a straight resin, that is, a homopolymer.

The carboxyl groups and/or hydroxyl groups in the lacquer may be present in the coating in the form of a copolymer of vinyl chloride units with units of an ethylenically unsaturated monomer having such polar groups, or in the form of a blend of a vinyl chloride resin with a resin containing such polar groups. From the view point of the processability or adhesion of the coating, it is preferred that vinyl acetate units be contained in the main chain of the vinyl chloride resin, and the vinyl acetate units may be present in an amount of up to 30% by weight in the lacquer.

As preferred examples of the carboxyl group-giving ethylenically unsaturated monomer, there can be mentioned acrylic acid, methacrylic acid, fumaric acid, maleic anhydride, crotonic acid, itaconic acid, citraconic acid and tetrahydrophthalic anhydride, and as preferred examples of the hydroxyl group-giving monomer, there can be mentioned vinyl alcohol (that is, saponified vinyl acetate), hydroxyethyl acetate, hydroxyethyl methacrylate, hydroxypropyl acrylate and hydroxypropyl methacrylate.

As preferred examples of the vinyl chloride resin, there can be mentioned polyvinyl chloride, a vinyl chloride-vinyl acetate copolymer, a partially saponified vinyl chloride-vinyl acetate copolymer, a vinyl chloride-vinyl acetate-acrylic acid copolymer, a partially saponified and partially butylated vinyl chloride-vinyl acetate copolymer, a vinyl chloride-vinyl acetate-methacrylic acid copolymer, a vinyl chloride-vinyl acetate-maleic anhydride copolymer, a vinyl chloride-vinyl acetate-hydroxyethyl acrylate copolymer and a vinyl chloride-vinyl acetate-hydroxyethyl mathacrylate copolymer. It is ordinarily preferred that a resin free of carboxyl groups and/or hydroxyl groups, such as polyvinyl chloride or a vinyl chloride-vinyl acetate copolymer, be used in the form of a blend with a vinyl chloride copolymer having carboxyl groups and/or hydroxyl groups.

The vinyl chloride resin may be used in combination of at least one member selected from thermosetting resins, especially hydroxyl group-containing thermosetting resins, such as resol type phenol-aldehyde resins, novolak type phenol-aldehyde resins, urea-aldehyde resins, melamine-aldehyde resins, epoxy resins and alkyd resins.

The vinyl chloride resin may be used in the form of a solvent solution lacquer formed by dissolving the vinyl chloride resin in at least one member selected from an aromatic hydrocarbon solvent such at toluene or xylene, a ketone type solvent such as acetone, methylethyl ketone, methylisobutyl ketone or cyclohexanone, an alcohol type solvent such as ethanol, propanol or butanol, a cellosolve type solvent such as ethyl cellosolve or butyl cellosolve, and an ester type solvent such as ethyl acetate or butyl acetate. Furthermore, a so-called organosol lacquer formed by suspending vinyl chloride polymer particles in an organic solvent solution lacquer as mentioned above may be used. The lacquer is applied to the metal blank at a solid concentration of 10 to 50% by weight with a viscosity suitable for the coating operation. The coating operation can be performed according to optional coating means, such as roller coating, brush coating, doctor coating, spray coating, electrostatic coating and dip coating. In order to attain the objects of the present invention, it is preferred that the amount of the primer coated on the metal substrate be 0.5 to 30 g/m$^2$, especially 1 to 20 g/m$^2$, on the dry basis. The coated metal blank is heated at 150° to 350° C. for 5 seconds to 30 minutes in a hot air furnace or an infrared ray heating furnace to effect baking and obtain an intended coating.

A seamless cup is obtained by punching the above-mentioned coated or uncoated metal blank into a disc or the like, subjecting the disc or the like to one-staged or multi-staged drawing processing between a drawing punch and a drawing die, and if desired, subjecting the drawn cup to multi-staged ironing processing between an ironing punch and a ironing die. Known drawing processing and ironing processing procedures and conditions may be adopted.

The thickness of the coated metal blank to be subjected to the above-mentioned processing is changed according to the final dimension of the vessel or the kind of the metal blank, but it is preferred that the thickness of the metal blank be 0.1 to 0.5 mm, especially 0.2 to 0.35 mm. In the case where the ironing processing is carried out, it is preferred that the thickness of the side wall be 0.05 to 0.20 mm, especially 0.06 to 0.17 mm.

In this case, it is preferred that a cup-shaped molded body be prepared by subjecting a coated metal blank to draw forming or draw-redraw (deep draw) forming. However, there may be adopted a method in which an uncoated metal blank is subjected to draw-ironing processing to form a cup-shaped molded body and this cup-shaped molded body is coated with a vinyl chloride resin lacquer as mentioned above.

The adhesive of the present invention is applied to open ends of cups to be bonded prior to fitting of the cups. It is preferred that the adhesive be applied so that the thickness of the resin layer is 10 to 200 µm, especially 20 to 150 µm, and the width of the lap-bonded portion, that is, the lap width, is 1 to 30 mm, especially 2 to 20 mm.

The adhesive resin may be applied to the open ends of the cups in the form of a film, a powder, a slurry, a solution, a plastisol or an emulsion. The adhesive of the present invention is advantageous in that the adhesive can be applied in the form of a film which can be handled and coated very easily and has a good adaptability to the drying operation or the like.

The adhesive may be applied by an optional method selected according to the form of the adhesive. For example, there may be adopted a lamination method, an extrusion method, an electrostatic powder coating method, an electrostatic deposition method, a spray coating method, a nozzle injection method, a dip coating method, a roll coating method and a brush coating method.

The portion to be bonded of the metal blank is coated with the above-mentioned lacquer, and this lacquer acts as a primer and a desirable bondability is obtained.

When the circumferential open ends of the cups are lap-bonded, the cut edge of the metal blank is inevitably exposed on the inner side of the seam. This cut edge can be protected by wrapping the cut edge with a tape of the adhesive or applying a powder, slurry or solution of the adhesive to the cut edge prior to fitting of the cups.

The adhesive may be applied to the outer surface and/or inner surface of the open end of the cup to be located on the inner or outer side of the seam.

The adhesive-applied cup is fitted with the other cup, and the adhesive present in the portion to be lap-bonded is melted, if necessary, followed by cooling, whereby a seam is formed. The heating of the portion to be lap-bonded can be accomplished by high frequency induction heating, infrared ray heating, hot air heating and heat conduction from a heating member. The cooling of the seam may be accomplished by optional means such as natural cooling, air cooling and water cooling.

In order to form a seam having excellent air tightness and bonding force, it is preferred that the adhesive be melted in the state where the adhesive layer is pressed and gripped between the open end to be located on the outer side of the seam and the open end to be located on the inner side of the seam. It is ordinarily preferred that the following relation be established among the dimensions of both the open ends to be formed into a circular lap-bonded portion and the adhesive layer:

$$D_O - D_I < 2d_A$$

wherein $D_I$ stands for the outer diameter of the open end located on the inner side, $D_O$ stands for the inner diameter of the open end located on the outer side, and $d_A$ stands for the thickness of the adhesive layer, and that the thickness of the adhesive layer after heat bonding be 10 to 150 µm, especially 10 to 100 µm.

The above-mentioned bottle-like metal vessel is especially valuable as a vessel for a content having a spontaneous pressure, such as carbonated drink, beer or frothed spirit or an inner pressure vessel in which a content is packed together with nitrogen gas or liquefied nitrogen.

Of course, the adhesive of the present invention is advantageously used for the manufacture of not only a metal vessel having a circumferential side seam as mentioned above, but also a metal vessel having a straight side seam, a bonded body comprising a flanged vessel and a lid, and other bonded structure.

The present invention will now be described in detail with reference to the following Examples that by no means limit the scope of the invention.

PREPARATION OF COPOLYESTER ADHESIVES

Copolyester adhesives used in the following Examples were prepared by carrying out polycondensation according to procedures described below and they were formed into film samples.

Predetermined acid and glycol components were charged in a glass reaction vessel together with a catalyst such as tetra-n-butyl titanate in an amount of about 0.04% by weight, and the mixture was heated at 200° C. with stirring and reaction was continued for about 100 minutes while removing methanol formed by the reaction. Then, the temperature was elevated to about 260° C. and polymerization was carried out for about 2 hours under a reduced pressure of 0.1 to 0.5 mmHg. The obtained copolyester was pelletized, inserted between two Teflon sheets and hot-pressed at a temperature higher by 20° to 30° C. than the melting point or softening point of the resin to obtain a filmy sheet having a thickness of about 80 µm. The final composition of each sample was confirmed by the proton NMR analysis and gas chromatography. The compositions determined from the analysis results are shown in Table 1. The physical properties of each sample were measured according to methods described below. The obtained results are shown in Table 1.

(a) Measurement of Reduced Viscosity ($\theta sp/C$):

The above-mentioned film was dried at 50° C. in vacuo for about 10 hours, and precisely measured 0.25 g of the film was dissolved in a mixed solvent comprising 60 parts by weight of phenol and 40 parts by weight of tetrachloroethane to form a solution having a concentration of 0.25 g/100 ml. In a water tank maintained at 30.0±0.1° C., the flow-down time of each of the solvent and the solution was measured three times by using an ubbellohde viscometer, and $\theta sp/C$ (dl/g) was calculated from the arithmetic mean values.

(b) Measurement of Crystallinity ($\alpha c$):

The film dried at room temperature in vacuo for about 5 hours was used as a sample, and the heat of fusion of the crystal was determined according to the differential thermal analysis (DSC) method and the crystallinity was calculated based on the fusion heat of 36.5 cal/g of 100% crystalline polybutylene terephthalate (PBT) [R. I. Miller and L. E. Nielsen, J. Polym. Sci., 55, 643 (1961)]. Perkin-Elmer Model DSC-2 was used as the measurement apparatus, and the heating rate was 20° C./min and indium was used as a reference sample. A data processing device was used for the calculation of the fusion peak area and the conversion of the heat quantity. When an exothermic peak due to crystallization was generated while the temperature was elevated, the corresponding heat was substrated from the heat of fusion measured.

(c) Measurement of Glass Transition Temperature (Tg):

A strip-like sample having a size of 1 cm × 8 cm was cut out from the film dried at room temperature in vacuo for about 5 hours. Viscoelasticity Spectrometer Model VES-HF supplied by Iwamoto Seisakusho was used as the dynamic viscoelasticity measuring apparatus, and the temperature dispersion of the logarithmic decrement was measured at a frequency of 1 Hz and a temperature-elevating rate of 1° C./min in a temperature range of from −50° C. to 100° C. The temperature at which the peak appeared was designated as the glass transition temperature of the sample.

EXAMPLES 1 THROUGH 16 AND COMPARATIVE EXAMPLES 1 THROUGH 6

The properties of the adhesives shown in Table 1 were evaluated according to methods described below.

In the following experiments, as the material to be bonded, there were used (i) an electrolytically chromate-treated steel plate (TFS) having a thickness of 0.21 mm, (ii) a chromate-treated aluminum plate (Al) having a thickness of 0.35 mm, (iii) a plate (TFS+E/P) prepared by coating a commercially available epoxy-phenolic lacquer on the TFS plate (i), followed by baking and curing, and (iv) a plate (Al+V) prepared by coating a commercially available modified vinyl lacquer on the aluminum plate (ii), followed by drying and baking.

Figure 4A:
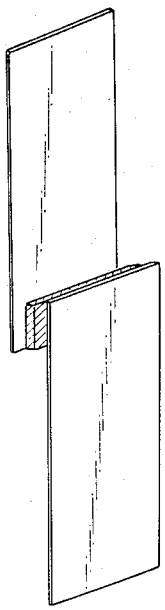
FIGS. 4a and 4b are diagrams illustrating a test piece used at the shear fracture test, the impact test under a stress and the creep test in hot water.
Figure 4B:
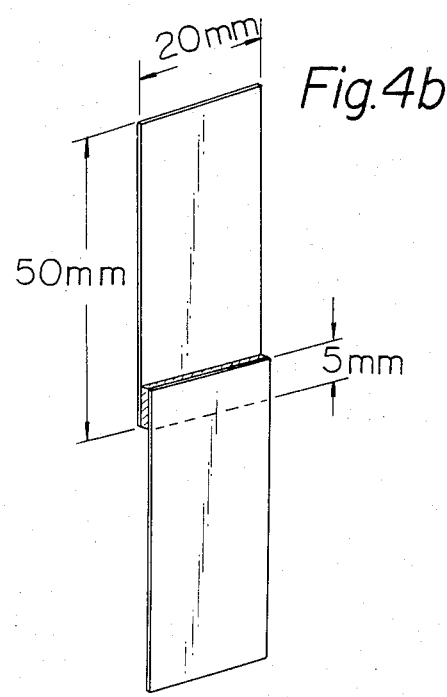

(a) Measurement of Bonding Strength (i) Shear Fracture Test:

Two cut plates having a width of 20 mm and a length of 50 mm were used, and as shown in FIG. 4, an adhesive film having a size of 5 mm × 20 mm was inserted between the two plates and the assembly was heated by high frequency induction heating under a pressure of about 2 Kg/cm$^2$ applied from the outer sides of both the plates so that the temperature was elevated to a level higher by 30° C. than the melting point (softening point) of the adhesive, whereby bonding was effected and a test piece was obtained.

A Tensilon tester was used and the test was carried out at room temperature and a crosshead speed of 100 mm/min. With respect to each sample, the test was conducted three times and the arithmetic mean value was calculated.

(ii) T-Peel Fracture Test:

Two cut plates having a width of 5 mm and a length of 70 mm were used, and an adhesive film having a size slightly larger than that of the plates was inserted between the two plates and the assembly was heated by high frequency induction heating under a pressure of about 2 Kg/cm$^2$ applied from the outer sides of the plates so that the temperature was elevated to a level higher by 30° C. than the melting point (softening point) of the adhesive. The adhesive protruded from between the plates was removed by a knife. Thus, a test piece was prepared.

A Tensilon tester was used and the test was carried out at room temperature and a crosshead speed of 200 mm/min. With respect to each sample, the test was conducted three times and the arithmetic mean value was calculated.

Furthermore, the above-mentioned sample was dipped in water maintained at 70° C. for 10 hours, and the test was carried out in the same manner as described above to examine the change of the bonding strength in hot water with the lapse of time.

(b) Impact Test under Stress

Figure 5A:
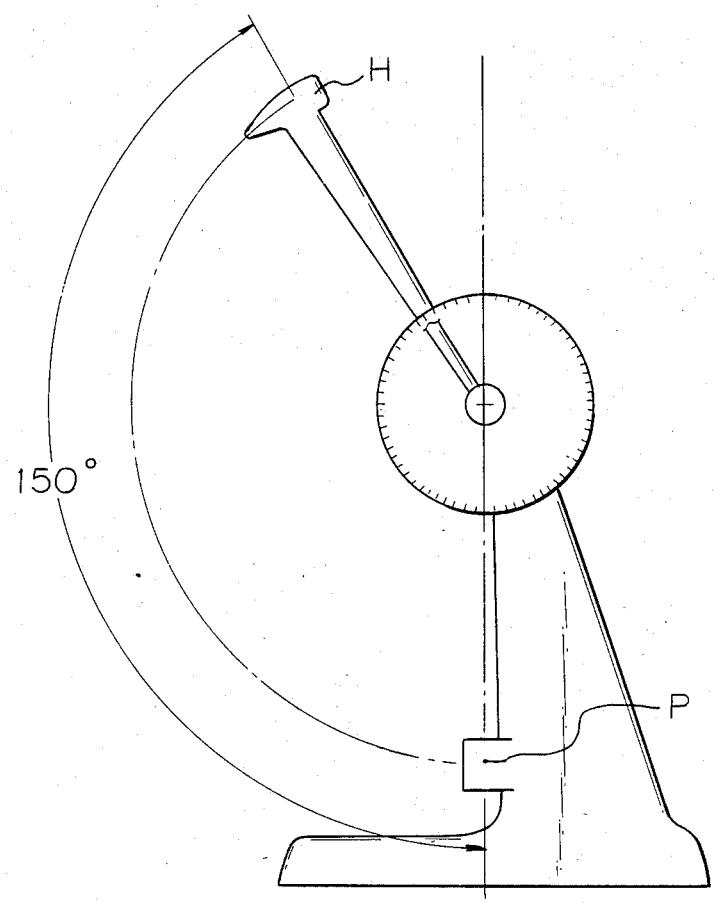
FIG. 5 is diagram illustrating (a) a pendulum type impact testing machine and (b) a test piece attaching mechanism, which are used at the impact test under a stress.
Figure 5B:
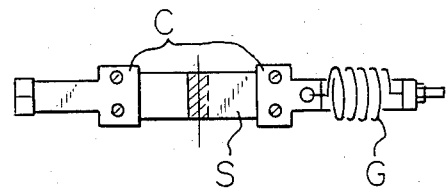

A test piece prepared in the same manner as described above with respect to the shear fracture test (a)-(i) was used. The principle of the test is shown in FIGS. 5-(a) and 5-(b). A pendulum impact testing machine customarily used at ordinary impact tests was used. As shown in detail in FIG. 5-(b), the test piece S was secured at a position P shown in FIG. 5-(a) through a chuck C and a spring G so that the bonded surface was vertical to a hammer H. A static load of 20 Kg, corresponding to a stress of 10 Kg per cm$^2$ of the bonded surface area, was always applied to the test piece by the spring. The hammer was released and a striking impact was given to the bonded portion. The weighing capacity of the testing machine was 40 Kgf·cm, the striking speed was 3.35 m/sec, and the shape of the hammer was one specified by JIS 7111, in which the lifting angle was 150°. The atmospheric temperature was adjusted 0° C. or 37° C. With respect to each sample, the test was conducted 10 times, and the number of samples where the bonded portion was partially or completely broken was counted.

(c) Creep Test in Hot Water

Figure 6:
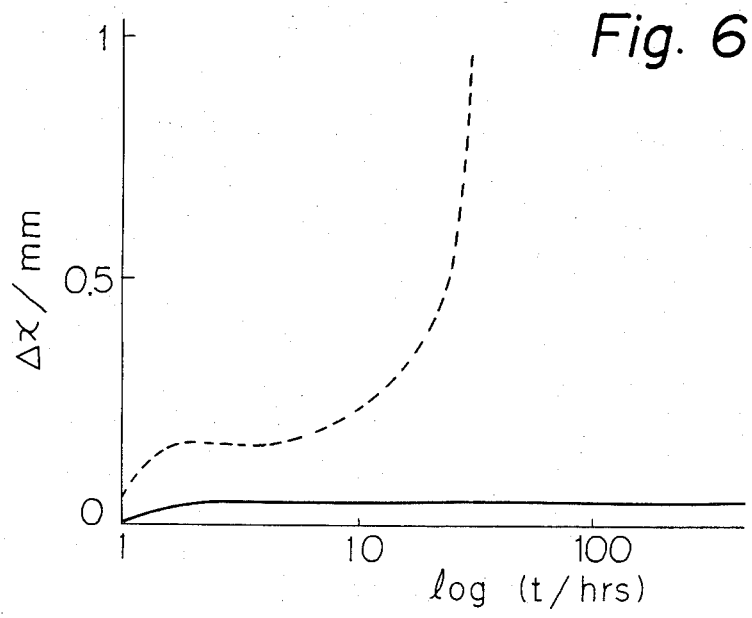
FIG. 6 shows an example of the change of the displacement quantity Δx with the lapse of time.
Figure 7:
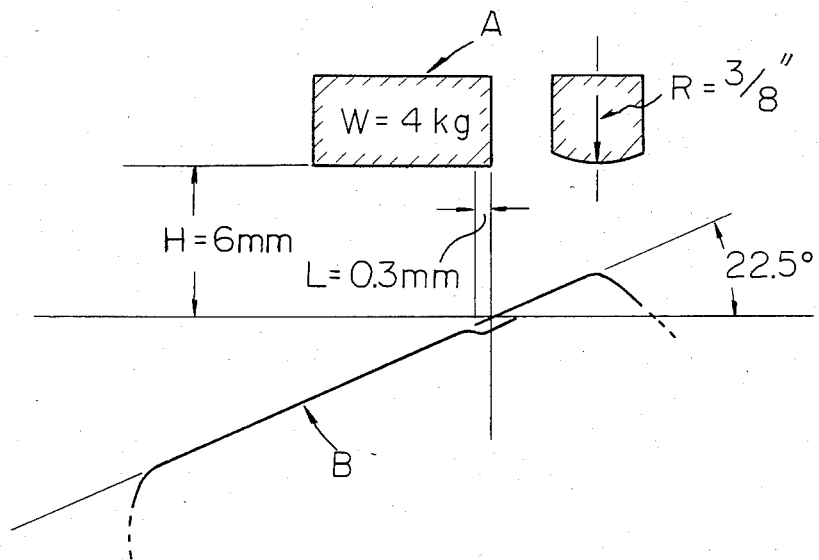
FIG. 7 is a view diagrammatically illustrating the denting test.

A test piece prepared in the same manner as described above with respect to the shear fracture test (a)-(i) by using plates (Al+V) (iv) described above was used. A creep testing machine constructed by remodelling a creep testing machine Model CSC-P supplied by Toyo Sokki K.K. so that the dipping test could be carried out was used. The temperature in the tank of the testing machine and the temperature of the immersion liquid (water) were maintained at 37° C. or 70° C. The test piece was attached to the testing machine and dipped in the immersion liquid. After passage of 30 minutes, a static load of 20 Kg was applied. The displacement quantity Δx mm was precisely measured by a differential transformer. Incidentally, the test piece was secured carefully so that no backlash was produced and even the displacement just after application of the load could precisely be measured. FIG. 6 shows the creep curve (solid line) of the test piece formed by using the adhesive of Example 2 and the creep curve (broken line) of the test piece formed by using the adhesive of Comparative Example 3, each being determined at 70° C. After passage of 24 hours, the displacement quantity Δx was read from the creep curve. With respect to each sample, the test was conducted three times, and the arithmetic mean value was calculated.

The results of the above tests and the physical properties of the adhesives are shown in Table 1.

TABLE 1

Adhesive

TABLE 1-continued

| | Code | Acid Component (mole %) | | Alcohol Component (mole %) | | | Physical Properties | | |
|---|---|---|---|---|---|---|---|---|---|
| | | T | other acid | B | DE | other alcohol | ηsp/C (dl/g) | αc(%) | Tg(°C.) |
| Example 1 | C1 | 97 | Az(3) | 70 | 15 | P(15) | 1.5 | 19 | 38 |
| Example 2 | C2 | 95 | S(5) | 90 | 10 | — | 1.3 | 26 | 35 |
| Example 3 | C3 | 95 | A(5) | 85 | 10 | N(5) | 1.2 | 18 | 37 |
| Example 4 | C4 | 95 | I(5) | 95 | 5 | — | 1.2 | 30 | 39 |
| Example 5 | C5 | 90 | A(10) | 90 | 10 | — | 1.0 | 26 | 37 |
| Example 6 | C6 | 90 | S(5),I(5) | 90 | 5 | P(5) | 1.4 | 27 | 40 |
| Example 7 | C7 | 90 | S(10) | 78 | 5 | E(17) | 1.3 | 15 | 45 |
| Example 8 | C8 | 85 | DP(15) | 85 | 15 | — | 0.9 | 24 | 34 |
| Example 9 | C9 | 85 | A(10),S(5) | 90 | 5 | E(5) | 1.2 | 20 | 39 |
| Example 10 | C10 | 80 | I(15),A(5) | 95 | 5 | — | 1.1 | 20 | 37 |
| Example 11 | C11 | 80 | DP(10),S(10) | 90 | 5 | P(5) | 1.5 | 25 | 43 |
| Example 12 | C12 | 80 | I(10),A(10) | 85 | 10 | E(5) | 1.2 | 23 | 38 |
| Example 13 | C13 | 75 | I(15),O(10) | 90 | 10 | — | 0.8 | 19 | 32 |
| Example 14 | C14 | 75 | I(15),O(10) | 85 | 10 | N(5) | 1.2 | 18 | 42 |
| Example 15 | C15 | 95 | S(5) | 90 | 10 | — | 1.7 | 25 | 35 |
| Example 16 | C16 | 95 | S(5) | 90 | 10 | — | 0.7 | 29 | 38 |
| Comparative Example 1 | C17 | 90 | O(10) | 80 | — | PE[500](20) | 1.2 | 16 | −5 |
| Comparative Example 2 | C18 | 95 | I(5) | 50 | 50 | — | 1.1 | 3 | 31 |
| Comparative Example 3 | C19 | 85 | A(15) | 70 | — | TE(30) | 1.0 | 15 | 24 |
| Comparative Example 4 | C20 | 55 | I(45) | 90 | 10 | — | 0.9 | 5 | 33 |
| Comparative Example 5 | C21 | 100 | — | 20 | 20 | E(60) | 0.8 | 20 | 45 |
| Comparative Example 6 | C22 | 95 | S(5) | 90 | 10 | — | 0.4 | 40 | 40 |

| | Bonding Strength (just after → after 10 hours in water at 70° C.) | | | | | | | | | | | | | | | |
|---|---|---|---|---|---|---|---|---|---|---|---|---|---|---|---|---|
| | Shear Fracture (kg/cm²) | | | | | | | | T-Peel Fracture (kg/cm) | | | | | | | |
| | TFS | | Al | | TFS + E/P | | Al + V | | TFS | | Al | | TFS + E/P | | Al + V | |
| Example 1 | 218→ | 185 | 195→ | 184 | 235→ | 220 | 250→ | 245 | 6.6→ | 6.0 | 4.5→ | 3.8 | 7.4→ | 6.2 | 8.4→ | 7.8 |
| Example 2 | 220 | 190 | 225 | 210 | 241 | 223 | 255* | 253* | 7.2 | 6.3 | 5.2 | 4.1 | 8.0 | 6.3 | 9.5 | 8.8 |
| Example 3 | 221 | 193 | 211 | 200 | 236 | 214 | 253* | 250* | 7.4 | 5.9 | 5.3 | 4.0 | 8.3 | 6.1 | 9.3 | 8.4 |
| Example 4 | 225 | 187 | 226 | 206 | 237 | 224 | 254* | 254* | 7.2 | 6.1 | 5.4 | 3.7 | 8.2 | 6.1 | 9.7 | 9.0 |
| Example 5 | 219 | 192 | 224 | 212 | 228 | 220 | 252* | 254* | 7.0 | 6.3 | 5.2 | 4.3 | 7.9 | 6.5 | 9.6 | 8.7 |
| Example 6 | 223 | 188 | 220 | 198 | 239 | 221 | 255* | 249 | 7.1 | 5.9 | 5.6 | 4.0 | 8.1 | 6.2 | 9.9 | 8.3 |
| Example 7 | 214 | 176 | 218 | 206 | 220 | 202 | 250 | 235 | 6.3 | 5.7 | 4.9 | 3.9 | 7.4 | 6.0 | 8.0 | 7.4 |
| Example 8 | 222 | 191 | 225 | 208 | 231 | 218 | 256* | 248 | 6.9 | 6.1 | 5.0 | 3.7 | 7.6 | 6.4 | 9.8 | 7.7 |
| Example 9 | 216 | 193 | 224 | 201 | 227 | 211 | 253* | 250 | 6.8 | 6.2 | 5.0 | 4.1 | 8.3 | 6.5 | 9.3 | 8.5 |
| Example 10 | 219 | 211 | 224 | 211 | 235 | 226 | 253* | 251* | 7.3 | 6.1 | 5.0 | 4.2 | 8.2 | 6.1 | 9.7 | 8.8 |
| Example 11 | 226 | 214 | 229 | 212 | 237 | 215 | 255* | 250 | 6.5 | 5.9 | 5.1 | 3.6 | 8.0 | 6.0 | 9.2 | 7.3 |
| Example 12 | 218 | 207 | 228 | 205 | 236 | 226 | 253* | 251* | 7.1 | 6.1 | 5.3 | 4.0 | 8.4 | 6.2 | 9.8 | 8.9 |
| Example 13 | 220 | 183 | 214 | 199 | 239 | 214 | 254* | 250 | 7.3 | 6.2 | 5.0 | 4.1 | 8.1 | 6.0 | 9.5 | 7.3 |
| Example 14 | 221 | 197 | 220 | 216 | 221 | 214 | 249 | 243 | 6.4 | 5.5 | 4.4 | 3.5 | 6.9 | 6.3 | 8.0 | 7.6 |
| Example 15 | 220 | 198 | 223 | 214 | 236 | 225 | 255* | 253* | 7.3 | 6.5 | 5.2 | 4.3 | 7.9 | 6.5 | 9.8 | 9.0 |
| Example 16 | 224 | 166 | 227 | 200 | 242 | 232 | 252* | 250 | 7.0 | 5.6 | 5.0 | 3.5 | 7.7 | 6.2 | 8.6 | 8.5 |
| Comparative Example 1 | 145 | 24 | 200 | 38 | 185 | 68 | 210 | 125 | 6.2 | 1.0 | 3.8 | 0.6 | 4.2 | 2.1 | 3.8 | 1.8 |
| Comparative Example 2 | 210 | 92 | 217 | 80 | 225 | 168 | 244 | 198 | 6.9 | 2.2 | 4.8 | 0.8 | 6.4 | 2.5 | 7.8 | 1.2 |
| Comparative Example 3 | 220 | 135 | 225 | 121 | 240 | 184 | 248 | 210 | 7.4 | 2.6 | 5.2 | 1.6 | 8.2 | 2.8 | 8.8 | 6.4 |
| Comparative Example 4 | 211 | 188 | 214 | 203 | 224 | 212 | 252* | 220 | 7.0 | 5.7 | 5.3 | 2.7 | 8.0 | 3.4 | 9.4 | 6.5 |
| Comparative Example 5 | 133 | 14 | 121 | 18 | 166 | 48 | 63 | 23 | 2.8 | 0.4 | 2.5 | 0.4 | 4.3 | 2.0 | 2.1 | 1.8 |
| Comparative Example 6 | 152 | 38 | 145 | 43 | 221 | 83 | 205 | 142 | 6.2 | 2.1 | 4.8 | 1.4 | 5.7 | 5.2 | 6.4 | 4.2 |

| | Impact Test under Stress | | | | | | | | Creep Test in Hot Water (mm) | |
|---|---|---|---|---|---|---|---|---|---|---|
| | TFS | | Al | | TFS + E/P | | Al + V | | Al + V | |
| | 0° C. | 37° C. | 0° C. | 37° C. | 0° C. | 37° C. | 0° C. | 37° C. | 37° C. | 70° C. |
| Example 1 | 0 | 0 | 2 | 1 | 0 | 0 | 0 | 0 | 0.05 | 0.12 |
| Example 2 | 0 | 0 | 0 | 0 | 0 | 0 | 0 | 0 | 0.02 | 0.08 |
| Example 3 | 0 | 0 | 0 | 0 | 0 | 0 | 0 | 0 | 0.06 | 0.13 |
| Example 4 | 0 | 0 | 0 | 0 | 0 | 0 | 0 | 0 | 0.02 | 0.13 |
| Example 5 | 0 | 0 | 0 | 0 | 0 | 0 | 0 | 0 | 0.04 | 0.09 |
| Example 6 | 0 | 0 | 0 | 0 | 0 | 0 | 0 | 0 | 0.02 | 0.06 |
| Example 7 | 1 | 0 | 2 | 0 | 0 | 0 | 0 | 0 | 0.01 | 0.13 |
| Example 8 | 0 | 0 | 0 | 0 | 0 | 0 | 0 | 0 | 0.03 | 0.10 |
| Example 9 | 0 | 0 | 0 | 0 | 0 | 0 | 0 | 0 | 0.04 | 0.08 |
| Example 10 | 0 | 0 | 0 | 0 | 0 | 0 | 0 | 0 | 0.03 | 0.09 |
| Example 11 | 1 | 0 | 1 | 1 | 0 | 0 | 0 | 0 | 0.02 | 0.05 |
| Example 12 | 0 | 0 | 0 | 0 | 0 | 0 | 0 | 0 | 0.02 | 0.07 |

TABLE 1-continued

|  |  |  |  |  |  |  |  |  |  |  |
|---|---|---|---|---|---|---|---|---|---|---|
| Example 13 | 0 | 0 | 0 | 0 | 0 | 0 | 0 | 0 | 0.05 | 0.12 |
| Example 14 | 0 | 0 | 0 | 0 | 0 | 0 | 0 | 0 | 0.04 | 0.16 |
| Example 15 | 0 | 0 | 0 | 0 | 0 | 0 | 0 | 0 | 0.02 | 0.11 |
| Example 16 | 1 | 1 | 0 | 0 | 0 | 0 | 0 | 0 | 0.02 | 0.07 |
| Comparative Example 1 | 8 | 6 | 4 | 1 | 6 | 4 | 3 | 1 | 0.14 | 0.85 |
| Comparative Example 2 | 2 | 0 | 0 | 0 | 0 | 0 | 0 | 0 | 0.13 | 1.25 |
| Comparative Example 3 | 0 | 0 | 0 | 0 | 0 | 0 | 0 | 0 | 0.08 | 0.65 |
| Comparative Example 4 | 2 | 0 | 1 | 0 | 0 | 0 | 0 | 0 | 0.07 | 1.20 |
| Comparative Example 5 | 10 | 10 | 10 | 10 | 6 | 5 | 9 | 9 | 0.10 | fracture |
| Comparative Example 6 | 10 | 7 | 8 | 4 | 6 | 0 | 4 | 1 | 0.02 | fracture |

Note
Acid Component:
T: terephthalic acid
I: isophthalic acid
A: adipic acid
S: sebacic acid
O: orthophthalic acid
Az: azelaic acid
DP: diphenolic acid
Alcohol Component:
B: 1,4-butane-diol
E: ethylene glycol
P: propylene glycol
N: neopentyl glycol
TE: triethylene glycol
PE: [ ]: polyethylene glycol [number average molecular weight Mn]
The mark "*" in the column of "Shear Fracture" indicates that fracture was caused in the plates.

EXAMPLES 17 THROUGH 26 AND COMPARATIVE EXAMPLES 7 THROUGH 12

A vinyl type lacquer comprising 60% by weight of vinyl chloride resin particles, 40% by weight of a vinyl chloride/vinyl acetate/maleic anhydride copolymer having a weight ratio of 86/11/3 and 10% by weight, based on the total resin, of epoxidized soybean oil was coated on the inner and outer surfaces of an aluminum plate (aluminum 3004, H19 chromate-treated) having a thickness of 0.23 mm so that the amount coated was 180 mg/dm$^2$ on the inner surface and 80 mg/dm$^2$ on the outer surface, and the coating was baked. The coated aluminum plate was punched into a disc having a diameter of 250 mm. The disc was subjected to ordinary press forming to obtain an upper member in which the inner diameter of the end edge of the portion to be bonded was 110.6 mm and a pouring opening having a diameter of 30 mm was formed at the center.

A disc having a diameter of 250 mm was punched out from the same coated plate, and the disc was subjected to ordinary press forming to obtain a lower member in which the outer diameter of the end edge of the portion to be bonded was 110.6 mm.

The adhesive was coated along the entire circumference of the end edge of the lower member according to the method described below so that the adhesive-applied width was about 5.5 mm on the outer surface side and about 1.5 mm on the inner surface side. More specifically, an adhesive film having a composition and properties shown in Table 1, which had a thickness of 80 μm and a width of 7 mm, was applied to the entire circumference of the end edge of the outer surface of the lower member heated in advance by high frequency induction heating, so that the adhesive film protruding from the end edge along a length of about 1.5 mm. The protruded portion of the film was folded back and was applied to the inner surface of the cut edge of the lower member while heating it again by high frequency induction heating, whereby a lower member having the end edge covered with the adhesive was prepared.

The upper member was fitted with the adhesive-applied lower member, and the fitted portion was heated by high frequency induction heating to melt the adhesive, and the adhesive was then solidified by cooling to obtain a metal vessel having a capacity of about 2 liters, which comprised the bonded upper and lower members.

The strength of the bonded portion of the metal vessel was evaluated. Separately, beer was filled in the metal vessel and the pouring opening was plugged. Sterilization was carried out at 65° C. for 30 minutes and the packed vessel was allowed to stand at 50° C. The change of the inner volume, leakage and breakage of the barrel were checked. Furthermore, the denting test and falling tests were carried out, and leakage and breakage of the barrel were checked. The obtained results are shown in Table 2.

In this Example, the metal vessel was evaluated according to the following methods.

EVALUATION OF METAL VESSEL (a) Measurement of Shear Strength of Bonded Portion Each of the bonded metal vessel and the metal vessel filled with water was allowed to stand still at 70° C. for 10 hours, and a specimen containing a bonded portion having a length of 7 cm in the direction of the height and a length of 2 cm in the circumferential direction was taken out from the metal vessel. The shear fracture test was carried out at a pulling speed of 100 mm/min at room temperature by using a Tensilon tester, and the shear strength was determined while taking the bonded area of the lap-bonded portion into consideration. With respect to each sample, three vessels were tested, and the arithmetic mean value was calculated. In Table 2, in a sample having a strength of 54 to 57 Kg/cm$^2$, fracture was caused in the plates, and the actual strength was higher than the indicated value.

(b) Measurement of Peel Strength of Bonded Portion

Each of the bonded metal vessel and the metal vessel filled with water was allowed to stand still at 70° C. for 10 hours. A circumferential specimen was cut out from the metal vessel, and the T-peel fracture test was carried out at a pulling speed of 200 m/min at room temperature by using a Tensilon tester. With respect to each sample, three vessels were tested, and the average peel strength was determined while the width of the lap-bonded portion was taken into consideration. The main fracture mode was classified as I (coating-plate interface), II (coating-adhesive interface), II (adhesive) or IV (coating) by visual observation.

(c) Denting Test

The metal vessel was filled with a predetermined content, and as shown in FIG. 4, a 4-Kg weight A was dropped from a predetermined height (6 mm) vertically on the metal vessel B at a point 0.3 mm apart from the end edge of the outer member in the bonded portion, while the metal vessel B was inclined at an angle of 22.5° to the horizontal direction.

The vessel in which the upper member was separated from the lower member or a gap was formed in the bonded portion at this test was designated as "broken barrel", and the vessel in which the inner pressure measured after 48 hours' standing at 23° C. was lower by more than 5% than the inner pressure measured just after filling or bleeding of the content was observed in the vicinity of the bonded portion was designated as "leakage". In Table 2, the leakage ratio (%) of the number of the leakage vessels and broken barrel vessels to the total number of the tested vessels is shown. Incidentally, the parenthesized value in Table 2 incicates the broken barrel ratio (%) of the number of the broken barrel vessels to the total number of the tested vessels.

The test temperature was adjusted to 0° or 25° C. After it was confirmed that the temperature of the entire vessel structure arrived at this level, the test was carried out. Incidentally, with respect to each sample, 50 vessels were tested.

(d) Falling Test

Metal vessels were filled with a predetermined content, and the vessels were let to fall down at room temperature from a height of 90 cm so that (i) the bottom was located on the lower side (25 bottles) or (ii) the bonded portion was located on the lower side (25 bottles). The broken barrel was checked, and leakage was checked after 48 hours' standing. In Table 2, the leakage ratio (%) of the number of the broken barrel and leakage vessels to the total number of the tested vessels is shown, and the parenthesized value indicates the broken barrel ratio (%) of the number of the broken barrel vessels to the total number of the tested vessels. (e) Storage Test at 50° C. for 3 Months (i) Volume Change:

The total volume of the vessel before filling was measured, and the vessel was filled with a content. After the lapse of a predetermined period, the total volume was measured again when no leakage was observed, and the difference between the two measured volumes was designated as the volume change ΔV. With respect to each sample, 10 vessels were tested and the arithmetic mean value was calculated.

(ii) Leakage Ratio and Broken Barrel Ratio:

The vessel in which the upper member was separated from the lower member or a gap was formed in the bonded portion by deformation of the upper or lower member was designated as "broken barrel". The vessel in which the inner pressure measured at 25° C. was lower by more than 5% than the inner pressure measured just after filling and bleeding of the content was observed in the vicinity of the bonded portion was designated as "leakage". With respect to each sample, 50 bottles were tested. In Table 2, the leakage ratio (%) of the number of the broken barrel vessels and leakage vessels to the total number of the tested vessels is shown, and the parenthesized value indicates the broken barrel ratio (%) of the number of the broken barrel vessels to the total number of the tested vessels.

TABLE 2

| | | Strength of Bonded Portion | | | |
|---|---|---|---|---|---|
| | | Shear Strength (kg/cm$^2$) | | Peel Strength (kg/cm) | |
| | Adhesive Code | just after bonding | after standing at 70° C. | just after bonding | after standing at 70° C. |
| Example 17 | C1 | >56 | >57 | 7.0(I) | 5.2(I) |
| Example 18 | C2 | >55 | >56 | 7.3(I) | 6.1(I) |
| Example 19 | C5 | >55 | >54 | 7.1(I) | 5.8(I) |
| Example 20 | C6 | >53 | >55 | 6.2(I) | 4.8(III) |
| Example 21 | C7 | >59 | >54 | 6.4(I) | 5.4(I) |
| Example 22 | C10 | >55 | >55 | 7.0(I) | 6.2(I) |
| Example 23 | C11 | >54 | >53 | 6.0(I) | 4.3(III) |
| Example 24 | C12 | >54 | >54 | 6.8(I) | 5.4(I) |
| Example 25 | C15 | >57 | >56 | 7.4(I) | 6.3(I) |
| Example 26 | C16 | >58 | >57 | 7.1(I) | 4.3(III) |
| Comparative Example 7 | C17 | >54 | 48 | 4.2(II) | 1.6(II) |
| Comparative Example 8 | C18 | >55 | >52 | 6.6(I) | 1.4(II) |
| Comparative Example 9 | C19 | >56 | >57 | 7.0(I) | 2.8(II) |
| Comparative Example 10 | C20 | >55 | >53 | 5.3(I) | 5.4(I) |
| Comparative Example 11 | C21 | 52 | 18 | 1.8(II) | 0.6(II) |
| Comparative Example 12 | C22 | >54 | 50 | 5.2(I) | 2.9(II) |

| Denting Test | Falling Test | 3 Months' Standing at 50° C. |
|---|---|---|
| Leakage (Broken | Leakage (Broken | Volume |

TABLE 2-continued

| | Barrel) Ratio (%) | | Barrel) Ratio (%) | | Change | Leakage (Broken |
| --- | --- | --- | --- | --- | --- | --- |
| | 0° C. | 25° C. | method (i) | method (ii) | ΔV (ml) | Barrel) Ratio (%) |
| Example 17 | 2(0) | 0 | 0 | 0 | 1.0 | 0 |
| Example 18 | 0 | 0 | 0 | 0 | 0.3 | 0 |
| Example 19 | 0 | 0 | 0 | 0 | 0.5 | 0 |
| Example 20 | 0 | 0 | 0 | 0 | 0.4 | 0 |
| Example 21 | 0 | 0 | 0 | 0 | 0.9 | 0 |
| Example 22 | 0 | 0 | 0 | 0 | 0.4 | 0 |
| Example 23 | 0 | 0 | 0 | 0 | 0.3 | 0 |
| Example 24 | 0 | 0 | 0 | 0 | 0.2 | 0 |
| Example 25 | 0 | 0 | 0 | 0 | 0.3 | 0 |
| Example 26 | 2(0) | 0 | 0 | 0 | 0.2 | 0 |
| Comparative Example 7 | 66(40) | 22(6) | 4(4) | 28(12) | 30.5 | 12(4) |
| Comparative Example 8 | 8(0) | 2(0) | 0 | 0 | 14.2 | 8(0) |
| Comparative Example 9 | 2(0) | 0 | 0 | 0 | 4.5 | 4(0) |
| Comparative Example 10 | 4(2) | 0 | 0 | 4(0) | 6.2 | 0 |
| Comparative Example 11 | 96(58) | 46(12) | 48(24) | 84(36) | 35.2 | 98(78) |
| Comparative Example 12 | 66(40) | 22(14) | 16(4) | 32(16) | 22.1 | 48(16) |

EXAMPLE 27

A lacquer comprising 30% by weight of vinyl chloride resin particles, 55% by weight of a vinyl chloride/vinyl acetate/maleic anhydride copolymer having a weight ratio of 86/11/3 and 15% by weight of epoxidized soybean oil was coated on the inner and outer surfaces of a tin-bright-deposited steel plate (T-1, deposited amount of #50/50) having a thickness of 0.23 mm so that the amount coated was 150 mg/dm² on the inner surface side and 60 mg/dm² on the outer surface side, followed by baking. The coated steel plate was punched into a disk having a diameter of 94 mm and subjected to ordinary press forming to obtain an upper member in which the inner diameter of the end edge of the portion to be bonded was 64.48 mm and a pouring opening having a diameter of 25 mm was formed at the center.

Separately, a tin-deposited steel plate having a thickness of 0.30 mm was punched into a disk having a diameter of about 142 mm and the disk was formed into a cup having an inner diameter of about 85 mm between a drawing punch and a drawing die. Then, the cup was subjected to the re-drawing processing and was ironed by ironing punch and die having a diameter of about 66.1 mm. The same lacquer as applied to the upper member was coated on the upper surface by a mandrel coater so that the amount coated was 60 mg/dm², followed by baking. An epoxy-urea lacquer was spray-coated on the inner surface so that the amount coated was 150 mg/dm², followed by baking. The coated cup was subjected to the necking processing to obtain a lower member in which the outer diameter of the circumferential end edge was 64.40 mm.

An adhesive described below was coated on the entire circumference of the end edge of the lower member so that the adhesive-applied width was about 4 mm on the outer surface side and about 2 mm on the inner surface side. Namely, a film of the copolyester adhesive C10 (having properties shown in Table 1) having a thickness of 80 μm and a width of 6 mm was applied to the entire circumference of the outer surface end edge of the lower member heated in advance by high frequency induction heating so that the film protruded from the end edge along about 2 mm, and the protruding portion was folded back by a roll by heating the cut edge again by high frequency induction heating and was applied to the inner surface side, whereby a lower member having the end edge covered with the adhesive was prepared.

The upper member was fitted with the adhesive-applied lower member, and the fitted portion was heated by high frequency induction heating to melt the adhesive. The adhesive was solidified by cooling to obtain a bottle-shaped metal vessel having a capacity of about 500 ml, which comprised the bonded upper and lower members.

The so-prepared metal vessel was filled with synthetic carbonated drink, the pouring opening was plugged, and sterilization was carried out at 42° C. in a can warmer. The standing test at 50° C., the falling test and the denting test at 0° or 25° C. were carried out to evaluate the strength of the bottle. It was found that the metal vessel had practically satisfactory properties.

EXAMPLE 28

A vinyl lacquer comprising 60% by weight of vinyl chloride resin particles, 40% by weight of a vinyl chloride/vinyl acetate/maleic anhydride copolymer having a weight ratio of 86/11/3 and 10% by weight, based on the total resin, of epoxidized soybean oil was coated on the inner surface of an aluminum plate (3004, H19 chromate-treated) having a thickness of 0.23 mm so that the amount coated was 150 mg/dm², and the outer surface of the aluminum plate was coated with an epoxy-urea lacquer so that the amount coated was 60 mg/dm², followed by baking. The coated plate was punched into a disc having a diameter of 94 mm, and the disc was subjected to ordinary press forming to prepare an upper member in which the inner diameter of the end edge of the portion to be bonded was 64.45 mm and a pouring opening having a diameter of 25 mm was formed at the center.

Separately, an aluminum plate (3004, H-19) having a thickness of 0.30 mm was punched into a disc having a diameter of about 142 mm and the disc was formed into a cup having an inner diameter of about 85 mm between drawing punch and die. The cup was subjected to the re-drawing processing again and was ironed by ironing punch and die having a diameter of about 66.1 mm, followed by panelling. The inner and outer surfaces of the so-obtained lower member were degreased and washed according to customary procedures. The lower member was dipped in an aqueous solution of HF having a concentration of 0.5 g/l for 3 seconds and the lower member was immediately sprayed for 25 seconds with an aqueous solution containing 12 g/l of $CrO_3$, 50 g/l of $H_3PO_4$ and 8 g/l of NaF.HF to effect the surface treatment, followed by water washing and drying. A white lacquer composed of a modified acrylic resin was coated on the outer surface of the lower member except the portion of about 5 mm from the open end edge, and the outer surface was printed and coated with a finishing varnish of the epoxy-ester type. The portion of 5 mm from the open end edge was coated with a modified vinyl lacquer by a mandrel coater so that the amount coated was 60 mg/dm². The inner surface of the lower member was spray-coated with an epoxy-acrylic aqueous lacquer so that the amount coated was 150 mg/dm². After the baking treatment, the lower member was subjected to the necking processing to obtain a lower member in which the outer diameter of the circumferential end edge was 64.40 mm.

The adhesive was applied to the entire circumference of the end edge of the outer surface of the lower member in the following manner so that the adhesive-applied width was about 4 mm on the outer surface side and about 2 mm on the inner surface side. More specifically, a film of the copolyester adhesive C5 shown in Table 1, which had a thickness of 65 μm and a width of 6 mm, was applied to the entire circumference of the end edge of the outer surface of the lower member heated in advance by high frequency induction heating, so that the adhesive tape protruded along about 2 mm. Protruding portion was folded back by a roll while the end edge was heated again by high frequency induction heating, and the folded portion was applied to the inner surface side, whereby a lower member having the end edge covered with the adhesive was obtained.

The upper member was fitted with the adhesive-applied lower member, and the fitted portion was heated by high frequency induction heating to melt the adhesive, and the adhesive was solidified by cooling, whereby a bottle-shaped metal vessel having a capacity of about 500 ml, which comprised the bonded upper and lower members, was obtained.

The metal vessel was filled with synthetic carbonated drink, the pouring opening was plugged and sterilization was carried out at 42° C. in a can warmer. The standing test at 50° C., the falling test and the denting test at 0° or 25° C. were carried out to evaluate the strength of the bottle. It was found that no leakage was caused, no substantial dimensional change was caused and the amount of dissolved-out aluminium was very small. Thus, it was confirmed that the metal vessel had practically satisfactory properties.

EXAMPLE 29

A tin-deposited steel plate having a thickness of 0.30 mm was punched into a disc having a diameter of about 142 mm and the disc was formed into a cup having an inner diameter of about 85 mm between drawing punch and die. Then, the cup was subjected to the re-drawing processing and was ironed by ironing punch and die having a diameter of 66.1 mm. The outer surface of the cup was coated with the same lacquer as coated on the upper member, described below, by a mandrel coater so that the amount coated was 60 mg/dm², and the inner surface was spray-coated with an epoxy-urea type lacquer so that the amount coated was 150 mg/dm², followed by baking. The coated cup was then subjected to the necking processing to obtain a lower member in which the outer diameter of the circumferential end edge was 64.40 mm.

The adhesive was applied to the entire circumference of the end edge of the lower member in the following manner so that the adhesive-applied width was about 4 mm on the outer surface side and about 2 mm on the inner surface side. More specifically, a film of the copolyester adhesive C7 (having the composition and properties shown in Table 1) having a thickness of 80 μm and a width of 6 mm was applied to the entire circumference of the end edge of the outer surface of the lower member heated in advance by high frequency induction heating so that the adhesive tape protruded from the end edge along about 2 mm. Then, the protruding portion was folded back by a roll and applied to the inner surface side while the end edge was heated again by high frequency induction heating, whereby a lower member having the end edge covered with the adhesive was obtained.

The so-obtained lower member was fitted with the same aluminum upper member as used in Example 28, and the fitted portion was heated by high frequency induction heating to melt the adhesive, and the adhesive was solidified by cooling, whereby a bottle-shaped metal vessel having a capacity of about 500 ml, which comprised the bonded upper and lower members, was prepared.

The metal vessel was filled with synthetic carbonated drink, the pouring opening was plugged and sterilization was carried out at 42° C. in a can warmer. The standing test was conducted at 50° C. It was found that the amount of the dissolved-out metal was very samll. When the falling test and the denting test at 0° or 25° C. were carried out to evaluate the strength of the bottle, it was found that the metal vessel had practically satisfactory properties.

What is claimed is:

1. A hot-melt adhesive comprising a copolyester of a dibasic acid component comprising 70 to 97 mole % of terephthalic acid and other dibasic acid with a polyhydric alcohol component comprising 70 to 97 mole % of 1,4-butane-diol, 3 to 30 mole % of diethylene glycol and up to 20 mole % of other polyhydric alcohol having 2 to 5 carbon atoms, said copolyester having a reduced viscosity of at least 0.6 dl/g as measured at a temperature of 30° C. in a phenol/tetrachloroethane mixed solvent having a phenol/tetrachloroethane weight ratio of 60/40 at a polymer concentration of 0.25 g/100 ml, a glass transition temperature of at least 31° C. and a crystallinity of 15 to 40% said copolyester having a creep displacement quantity, $\Delta X$, of not greater than 0.16 mm, said creep displacement quantity being measured by applying a static load of 20 kg at a temperature of 70° C. to a test piece consisting of lap-bonded two cut plates having a width of 20 mm and a length of 50 mm through the copolyester adhesive film having a size of 5 mm × 20 mm and a thickness of about 80 microns, and determining the displacement quantity, $\Delta X$, after passage of 24 hours.

2. A hot-melt adhesive as set forth in claim 1, wherein the acid component comprises 80 to 95 mole % of terephthalic acid and other dibasic acid.

3. A hot-melt adhesive as set forth in claim 1, wherein the polyhydric alcohol component comprises 80 to 95 mole % of 1,4-butanediol, 5 to 20 mole % of diethylene glycol and up to 20 mole % of other polyhydric alcohol having 2 to 5 carbon atoms.

4. A hot-melt adhesive as set forth in claim 1, wherein said other dibasic acid is at least one member selected from isophthalic acid, cyclohexane-dicarboxylic acid, adipic acid, sebacic acid, succinic acid and dodecane-dicarboxylic acid.

5. A hot-melt adhesive as set forth in claim 1, wherein said other polyhydric alcohol is at least one member selected from ethylene glycol, propylene glycol, neopentyl glycol and glycerol.

6. A hot-melt adhesive as set forth in claim 1, which is used for the manufacture of a metal vessel having a circumferential side seam by bonding cup-shaped lower and upper members along circumferential open ends of said two members.

7. In a bottle-shaped metal vessel having a circumferential side seam formed by lap-bonding circumferential open ends of cup-shaped upper and lower members obtained by draw forming or draw-ironing forming of a metal blank through an adhesive, the improvement wherein said adhesive comprises a copolyester of a dibasic acid component comprising 70 to 97 mole % of terephthalic acid and 3 to 30 mole % of other dibasic acid with a polyhydric alcohol component comprising 70 to 97 mole % of 1,4-butane-diol, 3 to 30 mole % of diethylene glycol and up to 20 mole % of other polyhydric alcohol having 2 to 5 carbon atoms, said copolyester having a reduced viscosity of at least 0.6 dl/g as measured at a temperature of 30° C. in a phenol/tetrachloroethane mixed solvent having a phenol/tetrachloroethane weight ratio of 60/40 at a polymer concentration of 0.25 g/100 ml, a glass transition temperature of at least 31° C. and a crystallinity of 15 to 40%.

* * * * *